Figure 9:
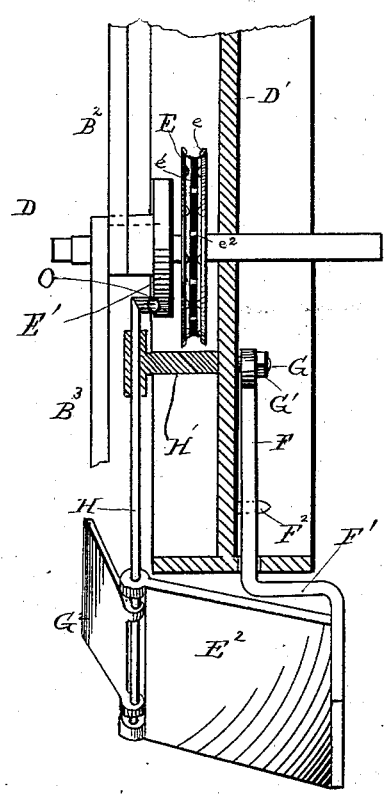

(No Model.) 4 Sheets—Sheet 1.
J. C. HARKER.
DITCHING MACHINE.
No. 312,631. Patented Feb. 24, 1885.
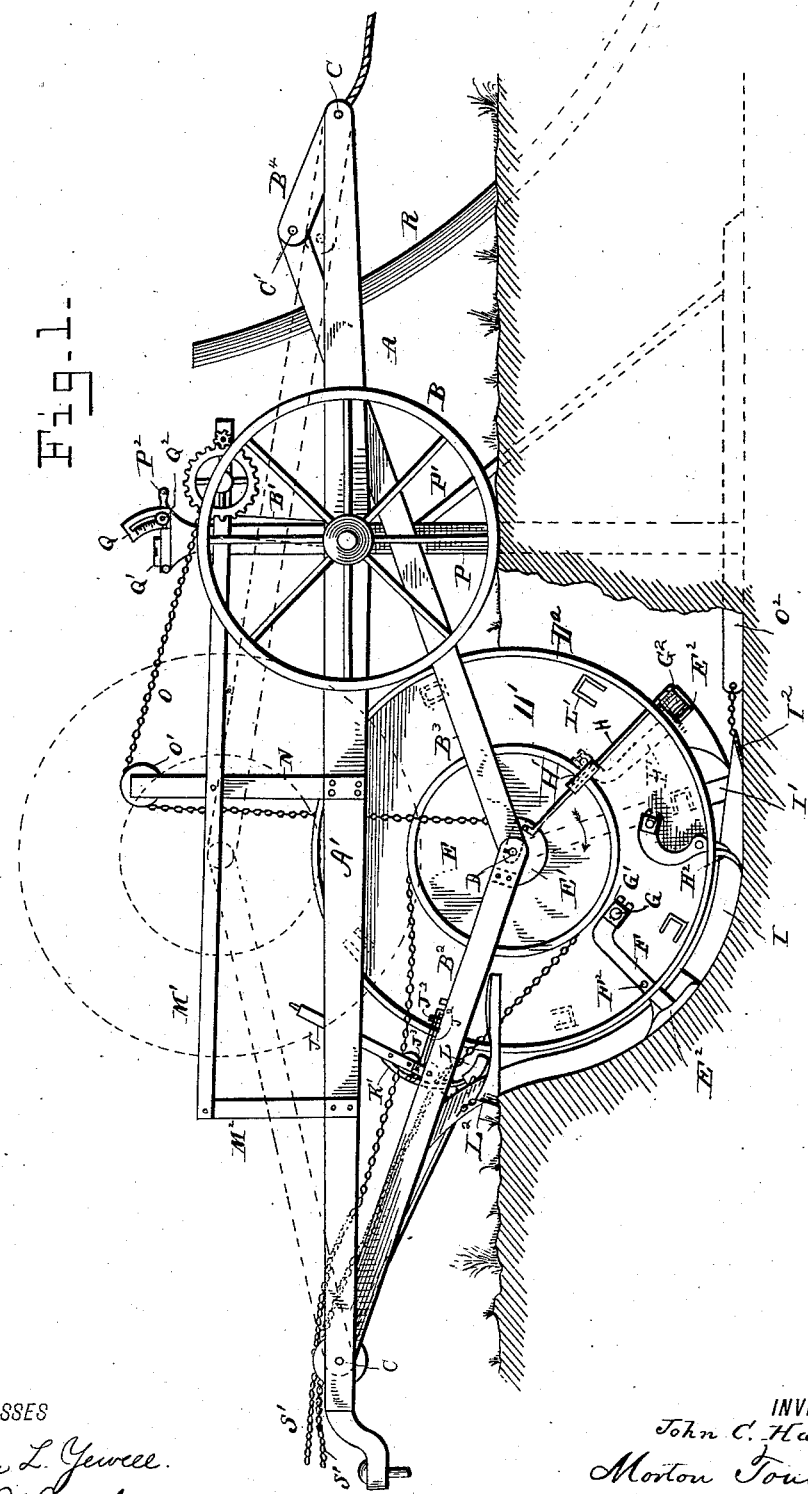
WITNESSES
Edwin L. Jewell.
Jos. H. Hunter.
INVENTOR
John C. Harker
Morton Toulmin
Attorney (No Model.) 4 Sheets—Sheet 2.
J. C. HARKER.
DITCHING MACHINE.
No. 312,631. Patented Feb. 24, 1885.
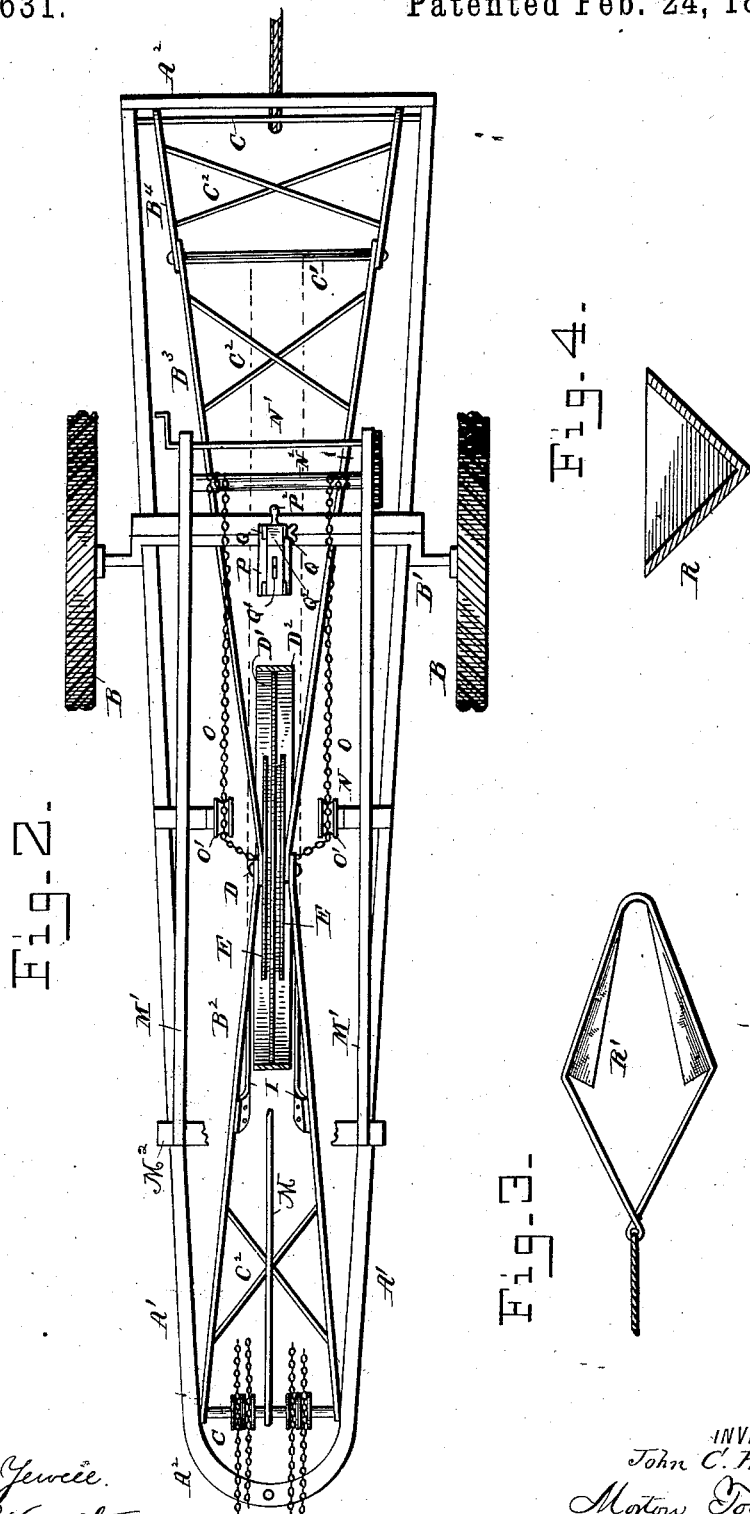
WITNESSES
INVENTOR
John C. Harker
Morton Toulmin
Attorney (No Model.) 4 Sheets—Sheet 3.
J. C. HARKER.
DITCHING MACHINE.
No. 312,631. Patented Feb. 24, 1885.
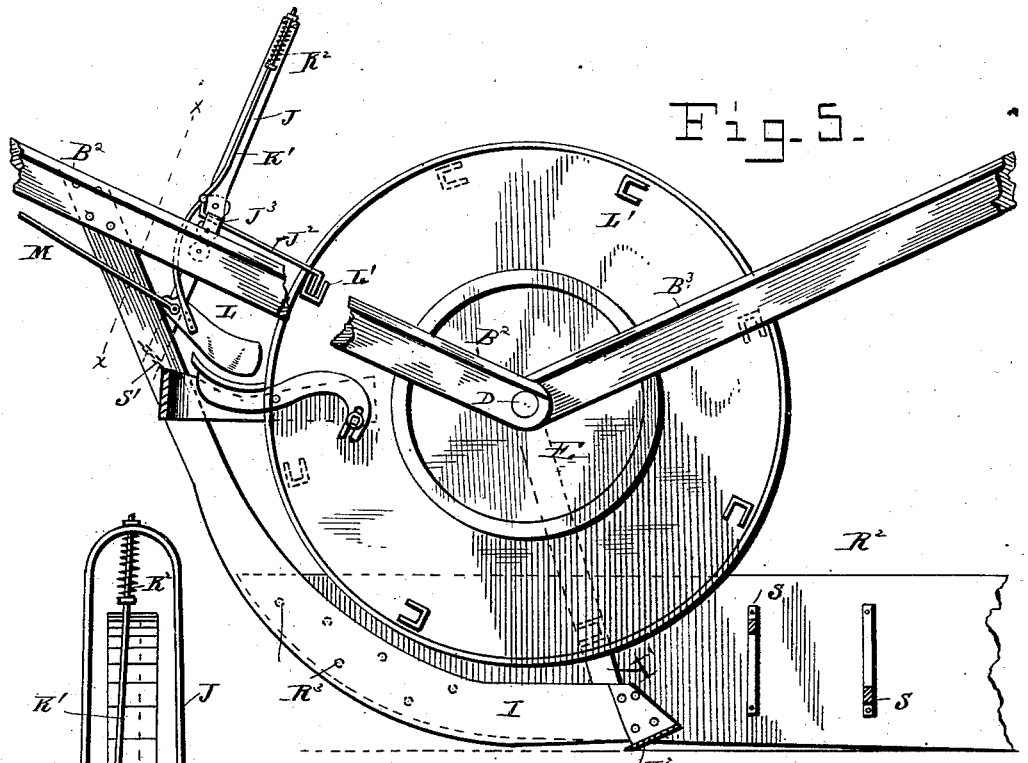
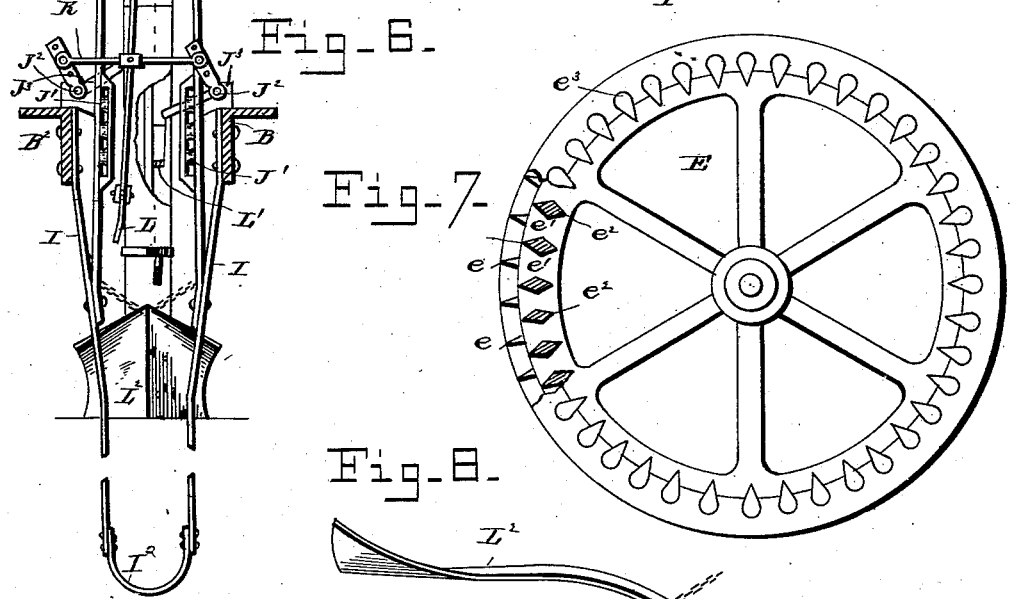
WITNESSES
INVENTOR (No Model.) 4 Sheets—Sheet 4.

J. C. HARKER.
DITCHING MACHINE.

No. 312,631. Patented Feb. 24, 1885.

WITNESSES
Edwin Bradford
A. H. Semmes

INVENTOR
John C. Harker
Morton Toulmin
Attorney

UNITED STATES PATENT OFFICE.

JOHN C. HARKER, OF GRAND JUNCTION, IOWA.

DITCHING-MACHINE.

SPECIFICATION forming part of Letters Patent No. 312,631, dated February 24, 13

Application filed December 14, 1883. Renewed September 17, 1884. (No model.)

*To all whom it may concern:*

Be it known that I, JOHN C. HARKER, a citizen of the United States, residing at Grand Junction, in the county of Greene and State of Iowa, have invented certain new and useful Improvements in Ditching-Machines, of which the following is a specification, reference being had therein to the accompanying drawings.

This invention relates to certain new and useful improvements in ditching-machines; and it has for its objects, first, to provide means for cutting ditches of different widths; second, to provide means for automatically clearing the shovels of the load they raise;
third, to provide means for spreading the soil away from the edges of the ditch as it is cleared from the shovels; fourth, to provide means for returning the soil to the ditch and to cover the tiles as they are laid, and, fifth, to provide means for grading or regulating the inclination of the ditch.

In carrying out the first object of my invention I provide a revolving disk with a series of plowshares disposed alternately on opposite sides of the disk, and I provide such shares with automatically-operated wings, which, as the plows advance through the soil, turn at an angle to the direction of the cut and prevent the soil from passing back over the mold-board.

In carrying out the second object of my invention I employ a flexibly-mounted rod having a scraping-blade at its lower end, in combination with a rock-shaft which is engaged by the rotation of the cutting-disk in such a manner as to give the scraping-blade a lateral sweep across the face of the cutting-plows.

In carrying out the third object of my invention I connect to the frame of the machine, in close proximity to the cutting-plows, a spreader consisting of two pieces united at their forward ends and diverged at their rear ends, the upper rear portions being turned outwardly.

In carrying out the fourth object of my invention I connect to the rear portion of the machine a coverer consisting, essentially, of two sides connected together at their rear ends and diverged toward their forward ends, the under forward portion being curved inwardly.

In carrying out the fifth object of my invention I employ a strip which follows the machine in the ditch and is flexibly connected thereto, the said strip being provided with an upright, upon which is located a spirit-level. This spirit-level will indicate the inclination of the strip which lies upon the bottom of the ditch, and hence will indicate the grade of the ditch itself.

Figure 10:
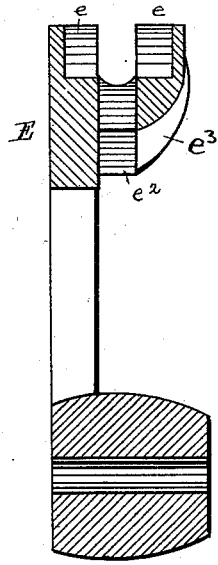
Figure 11:
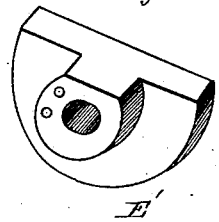

In the accompanying drawings, forming a part of this specification, and on which like letters of reference indicate corresponding features, Figure 1 represents a side elevation of my improved ditching-machine, showing a portion of a ditch in section, with the excavating-wheel and its attached devices lowered into the ditch. Fig. 2 represents a plan view of the ditching-machine; Fig. 3, a like view of the coverer; Fig. 4, a cross-sectional view of the conduit which conveys the tiles to the ditch; Fig. 5, a side elevation of the excavating-wheel, a portion of the frame, and the devices for clearing the shovels of their load, showing also the spreader in section, one of the cutters, and a fender to be used in excavating quicksand or loose soil in side elevation; Fig. 6, a sectional view on the line $x\,x$ of Fig. 5, showing the face of the excavating-wheel, the forward end of the spreader, and the devices for clearing the shovels of their load; Fig. 7, a view, partly in side elevation and partly in section, of the sprocket-wheel, which is mounted upon the shaft of the excavating-disk; Fig. 8, a plan view of the spreader detached; Fig. 9, a diametrical sectional view of a portion of the excavating-disk, showing the form of plow used in cutting wide ditches in rear elevation; Fig. 10, a cross-sectional view of a portion of the sprocket-wheel; and Fig. 11, a detached perspective view of the cam for operating the rock-shaft, upon which i mounted the pivoted plow-wing.

The letter A indicates the frame of my improved apparatus, the same consisting of the side bars, A', and the end pieces, A², constructed, preferably, of wood. This frame is mounted just back of the center upon the wheels B, which are fitted on the arched axle B', the same being secured to the bars A' of the frame. The object of the arch in the axle is to allow the excavator-frame to be elevated and lowered, as will presently appear, as also to form a support for the rear end of the windlass-frame.

The letter B² indicates the forward section, the letter B³ the intermediate section, and the letter B⁴ the rear section, of the excavator-frame, the same consisting of the side bars pivoted to the main frame of the apparatus at the forward and rear section, preferably upon the transverse shafts C. The intermediate section, B³, and the rear section, B⁴, are flexibly connected together by means of a third shaft, C′, as seen in Fig. 2 of the drawings. This frame is preferably constructed of "angle-iron," and is braced at suitable points by the cross-braces C². The forward and intermediate sections of the excavator-frame converge at the point where the excavator-disk is mounted, and are connected together by means of the disk-shaft D. On this shaft is mounted the excavator-disk D′, preferably constructed of steel, and provided with a rim, D². At each side of said disk and secured thereto, and mounted upon the shaft D, are the sprocket-wheels E, the peculiarities of which will presently appear. Also mounted loosely on the shaft D are the cams E′, the function of which will also presently appear.

I contemplate using several forms of plows or cutters, and will first describe that form used when it is desired to cut unusually wide ditches. It resembles the plow known in the trade as the "breaking-plow." These plows E² are located relatively with the disk as seen in Figs. 1 and 9, the standard F thereof being provided with an offset, F′, so as to bring the landside either in line with or slightly to one side of the edge of the rim D². The said rim is slotted at suitable distances apart and on alternate sides of the disk D′, for the reception of the standards F. From this it will be understood that the standards are placed on alternate opposite sides of the disk, and that consequently the plows used will be "rights" and "lefts," in order to bring the landside adjacent to the opposite sides of the ditch.

Extending from the disk D′ are studs or bolts F², which extend through the standards F and form pivotal points therefor. The upper ends of the standards are bifurcated and fit over bolts G, which also extend from the said disk, and which are provided with nuts G′, whereby the standards are held against the strain. It will be observed from Fig. 1 that the bifurcation is such that in case the plowshare E² meets with a stone, root, or other serious obstruction the upper end of the standard will be thrown forward clear of the bolts G, and the share itself tipped back until the obstruction is passed.

In order to prevent the soil which gathers on the mold-board from passing off, I provide a pivoted wing, G². (See Fig. 9.) This wing G² is mounted upon a rock-shaft, H, having bearings at the outer and rear portions of the plowshare at its lower end, and at its upper end in a bracket, H′, extending from the disk D′. A lateral extension of this shaft engages with a cam, E′, as the plow begins to enter the soil, whereby the wing G² is swung forward in a line nearly parallel with the landside, in which position it remains until the rotation of the disk has carried the rock-shaft beyond the upper edge of the cam, when the weight of the wing G² will cause it to fall back in the reverse direction and discharge the accumulated soil.

The plow shown farthest ahead in Fig. 1 is in the reverse position to that represented farthest back, and the rock-shaft which operates the wing of the one farthest ahead is on the opposite side of the disk.

The intermediate plow (shown at H²) is the other form which I contemplate using, and the blade of which approximates the shape of a "corn-plow shovel." The standard is pivoted and held in the same manner as the standard F of the plows E², and will free itself from the bolt G when the blade meets with an obstruction in the same manner as the standard F.

The letter I indicates the cutters, which are fastened at their forward ends to the sections B of the excavator-frame, and at their rear ends are attached to the shaft D by means of the braces I′, and to each other by means of the cross-piece I², which also forms a scoop to collect the loose dirt for the plow and evens the bottom of the ditch. The forward edges of these cutters are made sharp, and their function is to cut the earth at the sides of the ditch to assist the shovels H². These cutters are not used when the form of plow designated by the lettter E² is employed.

A yoke, J, is secured at a convenient point to the cutters I and to the section B² of the excavator-frame, as seen in Fig. 6, and is provided on opposite sides with a series of sheaves, J′, the purpose of which is to guide the drive-chains.

At each side and just forward of the excavator-disk the rock-shafts J² are secured in journal-boxes J³, mounted upon the section B² of the excavator-frame. The forward cranks of these rock-shafts connect by a pitman, K, with a rod, K′, flexibly connected at its upper end to the yoke J, where it is provided with a pressure-spring, K², for the purpose of keeping the scraper L in contact with the excavator-shovel, and at the same time to allow it to yield to any irregularity of the surface. The rear ends of these rock-shafts J² are provided with lateral extensions, which are engaged by the stirrups L′, secured at proper intervals relatively with the position of the excavator-shovels on the excavating-disk D′. When this engagement of the stirrups L′ with the rock-shafts J² takes place, the scraper L is drawn laterally across the excavating-shovel, which by this time has reached the line described by the sweep of said scraper.

It will be observed by reference to Fig. 6 that the respective rock-shafts J² are actuated at different times, so that while the scraper cleans one shovel in going in one direction it cleans the next succeeding shovel on the return-stroke, which is effected by the engagement of one of the stirrups on the opposite side of the disk. As the soil is in this manner swept from the shovels, it falls to either side of the spreader L². This spreader is constructed, preferably, of two pieces of metal united at their forward ends and diverged at their rear ends, the upper rear corners being bent upwardly, and it is secured loosely to the cutters I or other convenient point, so as to spread the soil away from the edge of the ditch as the machine advances forward.

A rod, M, is connected with the scraper L and with a convenient part of the frame and loosely with the shaft C, so as to prevent endwise movement of said scraper.

In order to elevate the excavator-frame and its attached devices, I construct a frame consisting of the side bars, M', and the uprights M², bolted to the bars A'. The bars M' are further supported by the standards N, which are also secured firmly to the frame A. The rear ends of the bars M' rest also upon the arch B', to which they are secured. Mounted on the said bars is a crank-shaft, N', provided with a pinion which meshes with a cog-wheel on the windlass-shaft N², also mounted on the said bars. To this windlass are secured elevating-chains O, which pass over pulleys O', journaled to the standards N. These chains connect with the elevator-frame near the shaft D. When it is desired to raise and lower the excavating devices, the chains O are wound upon or unwound from the windlass N² by means of the shaft N' and the intermediate gearing.

The object of the flexible joints between the sections B³ and B⁴ of the elevator-frame is to admit of the elevation of the said frame.

In order to automatically ascertain the inclination at which the ditch is being cut, I provide a grader consisting of a base-piece, O², having a straight edge on the lower side connected flexibly with the cross-bar I² of the cutters I. Extending at right angles from the strip O² is a standard, P, held firmly by a brace, P'. The said standard extends up any height above the frame of the machine, and is provided with a pivoted arm, P², and a fixed curved graduating-plate. A spirit-level, Q', is secured to the arm, and the inclination of the arm is maintained by means of the set-screw Q², which secures it to the graduated plate Q. If it be desired to incline the ditch one inch to the rod, the arm P² is set opposite the mark of the graduated plate which designates such inclination. This will cause the bubble in the spirit-level to appear at the end of the level next to the graduated plate. When the ditch has been cut a sufficient length to receive the base-strip O², the same is placed in the ditch and connected to the machine. The operator then regulates the depth of the excavators until the spirit-level indicates "level." As the machine advances ahead, it is only necessary to occasionally observe the spirit-level in order to keep the proper inclination.

The curved conduit or chute R is secured to the rear part of the machine, by which the tiles are fed to the ditch. The coverer R' then follows along, gathering and forcing the soil into the ditch over the tiles.

The sprocket-wheels E are constructed with a deep groove on their periphery, having a series of lugs, $e$, projecting inwardly from the sides of the groove and upwardly from the bottom of the groove. The spaces between each two of the lugs on the same side of the groove are occupied by the horizontal links of the chain, while the spaces between each opposite two of these lugs are occupied by the perpendicular links of the chain. Between such opposite lugs $e$ the body of the rim is cast with openings $e'$, the intermediate metal, $e^2$, forming the body of the rim and serving to unite the respective outer portions of the rim. Lugs $e^3$ are cast on one side of the rim, opposite the portions $e^2$ of the metal, so as to give additional strength to the rim. The spokes are flush with the inner side of the rim, and the hub on that side is flush with the spokes, so as to admit of the sprocket-wheels being fitted closely to the disk. The object in the openings $e'$ is to allow the dirt to escape, which is forced through by the links which travel over the sprocket-wheels on their edges.

The cams E' are provided with bosses, which are bolted, respectively, to the sides of the forward frame, B².

The fenders R² consist of strips of sheet-iron placed on their edges, and secured to the cutters I by means of bolts or rivets, as at R³, and braced together by cross-bars S. These fenders are used when ditching through quicksand or loose soil.

The drive-chains S' pass over the sprocket-wheels E and advance to a suitable motor, preferably a traction-engine, and particularly that described in my application for a patent on traction-engines, filed even date herewith. In that application I have described and illustrated a convenient and useful form of drive sprocket-wheels.

Having thus fully described my invention, what I claim as new, and desire to secure by Letters Patent, is—

1. In a ditching-machine, the combination, with a rotating excavating-disk, of a plow secured thereto, and provided with a wing which will automatically operate to prevent the soil from passing off behind the plowshare.

2. In a ditching-machine, the combination, with a rotating disk and a fixed cam, of a plow having its standard secured to one side of said disk, and adapted to free itself under extreme strain, and a wing mounted upon a rock-shaft journaled to said plow, and adapted to engage a fixed cam during the rotation of the disk, whereby the wing is automatically operated to prevent the soil from passing off behind the plowshare, and to free itself from said cam to discharge the soil from the wing.

3. In a ditching-machine, the combination, with an excavating-disk, the stirrups secured on opposite sides thereof, and the plows to the periphery thereof, of the automatically-operated scraper, the forwardly and upwardly extending rods, whereby the scraper is supported, and the rock-shafts actuated by said stirrups for operating the scraper in opposite directions.

4. In a ditching-machine, the combination, with an excavating-disk, the plows, and the stirrups secured thereto, of the scraper, the rock-shafts, and the intermediate devices actuated by said stirrups for operating the same.

5. In a ditching-machine, the combination, with the rotating disk having excavating-shovels, of the yielding and flexibly-mounted scraper L and the rock-shafts $J^2$, adapted to actuate the same, respectively, in opposite directions by the engagement of the disk therewith.

6. In a ditching-machine, the combination, with a rotating disk, of the yoke, the yielding and flexibly-mounted rod having a scraper at one end, and the rock-shafts and pitmen connecting therewith, the said shafts being adapted to be operated by the rotating disk, so as to actuate the scraper in opposite directions.

7. In a ditching-machine, the combination, with a rotating disk having excavating-shovels, of the curved cutters secured to the excavating-frame, adapted to cut the soil at each side of the ditch, and provided with a scoop for evening the bottom of the ditch and clearing loose dirt.

8. In a ditching-machine, the combination, with a rotating disk and the excavating-shovels, of the automatically-operated scraper and the spreader adapted to spread the soil as it falls from the excavators.

9. A ditch-grader adapted to be drawn through the ditch, consisting of a base-strip provided with a rigidly-connected upright carrying a graduated plate, and a pivoted arm provided with a spirit-level, the arm and the graduated plate being adapted to be rigidly connected together, whereby the inclination of the ditch is predetermined and ascertained as it is being dug.

10. The combination, with a ditching-machine, of a spreader flexibly secured to the forward part of the machine in front of the excavating devices, and a coverer similarly secured to the rear part of the machine in the rear of said devices, whereby the soil is spread from the side of the ditch and returned to and thrown into the ditch.

11. In a ditching-machine, the sprocket-wheel for driving excavating devices, provided with a rim having a double series of lugs formed upon its periphery and an intermediate series of openings through the rim.

12. In a ditching-machine, the sprocket-wheel for driving excavating devices, having the hub, the spokes, and the rim flush on one side, and provided on its periphery with a double series of lugs, a series of strengthening-lugs on the outer side, and an intermediate series of openings through the rim.

13. In a ditching-machine, the combination, with a rotating excavator, of the curved cutters and the side fenders, to prevent sand and loose soil from filling in the ditch.

In testimony whereof I affix my signature in presence of two witnesses.

JOHN C. HARKER.

Witnesses:
C. A. NEALE,
JOS. H. HUNTER.